(12) United States Patent
Chen

(10) Patent No.: US 11,787,919 B2
(45) Date of Patent: Oct. 17, 2023

(54) HUSK PLASTIC COMPOSITE, PRODUCTION METHOD AND APPLICATION THEREOF

(71) Applicant: DONGGUAN MEIGER PLASTIC PRODUCTS CO., LTD., Guangdong (CN)

(72) Inventor: Ben-Yuan Chen, New Taipei (TW)

(73) Assignee: DONGGUAN MEIGER PLASTIC PRODUCTS CO., LTD., Dongguan (CN)

( * ) Notice: Subject to any disclaimer, the term of this patent is extended or adjusted under 35 U.S.C. 154(b) by 25 days.

(21) Appl. No.: 17/562,230

(22) Filed: Dec. 27, 2021

(65) Prior Publication Data

US 2023/0033191 A1    Feb. 2, 2023

Related U.S. Application Data

(60) Provisional application No. 63/224,520, filed on Jul. 22, 2021.

(51) Int. Cl.
| | |
|---|---|
| *C08K 11/00* | (2006.01) |
| *C08F 16/06* | (2006.01) |
| *C08F 18/08* | (2006.01) |
| *C08F 22/30* | (2006.01) |
| *C08F 14/06* | (2006.01) |
| *B29C 48/00* | (2019.01) |
| *B29C 48/68* | (2019.01) |
| *B29C 48/07* | (2019.01) |
| *B29K 29/00* | (2006.01) |
| *B29K 27/06* | (2006.01) |
| *B29K 79/00* | (2006.01) |
| *B29K 105/16* | (2006.01) |

(52) U.S. Cl.
CPC .......... *C08K 11/005* (2013.01); *B29C 48/022* (2019.02); *B29C 48/07* (2019.02); *B29C 48/682* (2019.02); *C08F 14/06* (2013.01); *C08F 18/08* (2013.01); *C08F 22/30* (2013.01); *B29K 2027/06* (2013.01); *B29K 2029/04* (2013.01); *B29K 2079/00* (2013.01); *B29K 2105/16* (2013.01); *B29K 2911/00* (2013.01); *B29K 2995/0097* (2013.01); *C08K 2201/005* (2013.01)

(58) Field of Classification Search
CPC ........ C08K 11/005; C08F 16/06; C08F 18/08; C08F 22/30; C08F 14/06; B29C 48/022; B29C 48/682; B29C 48/07; B29K 2029/04

See application file for complete search history.

(56) References Cited

U.S. PATENT DOCUMENTS

2018/0257757 A1*   9/2018   Pero, III ................... B64C 1/40

FOREIGN PATENT DOCUMENTS

| WO | WO-2015120389 A1 * | 8/2015 | ........... A61K 31/277 |
| WO | WO-2015195143 A1 * | 12/2015 | ............... C08K 7/14 |
| WO | WO-2018120389 A1 * | 7/2018 | ........ H04W 36/0005 |

OTHER PUBLICATIONS

Armstrong Flooring, Summary Armstrong Flooring Products Compliance with: ASTM F 3261 Standard Specification for Resilient Flooring in Modular Format with Rigid Polymeric Core, https://armstrongflooringpartner.force.com/ArmstrongConnect/s/article/ASTM-F-3261-Rigid-Polymeric-Core.

* cited by examiner

*Primary Examiner* — Robert D Harlan

(57) ABSTRACT

A husk plastic composite comprises a composition including: PVC 10 to 20 wt %; vinyl chloride/vinyl acetate (VC/VAC) copolymer 10 to 30 wt %; styrene-acrylonitrile copolymer (SAN) 1 to 5 wt %; chlorinated polyethylene (CPE) 1 to 5 wt %; rice husk powder 10 to 40 wt %; inorganic filler 10 to 40 wt %; internal lubricant 0.1 to 1 wt %; external lubricant 0.1 to 1 wt %; and heat stabilizer 1 to 5 wt %. The VC/VAC copolymer in the husk plastic composition can allow the composition to be processed by relatively lower processing temperature to save energy consumption, prevent the husk powder from being burnt or decomposed due to high temperature during the heating process to allow this natural material being added in a large amount in the composition and can reduce the amount of PVC through a large amount of filling additives but still maintain in good product mechanical properties.

9 Claims, 3 Drawing Sheets

HUSK PLASTIC COMPOSITE, PRODUCTION METHOD AND APPLICATION THEREOF

FIELD OF INVENTION

The present invention relates to a composition material, particularly a plastic composition material containing a high amount of rice husk additive.

A first application of the present invention is a plastic flooring and will describe as multiple embodiments as follows. However, the present invention is not limited to this single application. Any other reasonable and equivalent changes or modifications should be contained in claimed scope of the present invention.

BACKGROUND OF THE INVENTION

Rice is a main daily consume product being widely produced in many Asian countries. The byproducts during the production of rice including rice husk and rice straw become a rich source of natural materials. The rice husk and the rice straw although came from different parts of rice plant but have similar components with high content of fiber. However, these two byproducts are normally considered as agricultural wastes without being properly used. It is also a high cost to even deal with these materials as disposal. Hence, it is very common nowadays to see famer burning these byproducts in filed directly which causes another problem as air pollution.

SUMMARY OF THE INVENTION

In order to solve the problem of the rice husk being considered as agricultural waste with no economic value and the disposal of such material may cause potential environmental pollutions, the present invention provides a husk plastic composition comprising: PVC 10 to 20 wt %; vinyl chloride/vinyl acetate copolymer (VC/VAC) 10 to 30 wt %; styrene-acrylonitrile copolymer (SAN) 1 to 5 wt % f; chlorinated polyethylene (CPE) 1 to 5 wt %; rice husk powder 10 to 40 wt %; inorganic filler 10 to 40 wt %; internal lubricant 0.1 to 1 wt %; external lubricant 0.1 to 1 wt %; and heat stabilizer 1 to 5 wt %.

The present invention also provides a processing method of a husk plastic composition comprising steps of: providing a husk plastic composition as above; using a twin screw extruder to heat and knead the husk plastic composition, wherein the twin screw extruder comprises multiple different mixing sections with different temperature including a feeding section, a plasticizing section, a compression section, a vent section and a metering section; and molding the husk plastic composition into sheet or plate material by an extrusion die, wherein the extrusion die comprises an extrusion channel with a flat slit opening extending in the horizontal direction which includes different temperature in each molding section.

Further, the present invention also provides a plastic flooring using the husk plastic composition and the processing method as above.

In accordance, the present invention has the following advantages:

1. The VC/VAC copolymer in the husk plastic composition provided by the present invention can allow the composition to be processed by relatively lower processing temperature to save energy consumption. It will also prevent the husk powder from being burnt or decomposed due to high temperature during the heating process to allow this natural material being added in a large amount in the composition. The present invention can reduce the amount of PVC through a large amount of filler but still maintain in good product mechanical properties. The particle size of the husk is preferably in the range of 0.10~0.60 mm for better hardness, stiffness and wood-like texture in the final product.

The present invention provides husk plastic composition or HPC composition to be produced in a sheet product as a core layer to be laminated with other surface materials. As the embodiment of HPC composition mentioned above, the husk plastic composite core layer is laminated with a PVC print layer and a PVC wear layer on the surface to form a decorative panel, which can be applied to floors or wall constructions. Further, the laminates could adhere with foam layer to provide impact-resistant and sound insulation properties.

DETAILED DESCRIPTION OF THE PREFERRED EMBODIMENTS

Figure 1A:
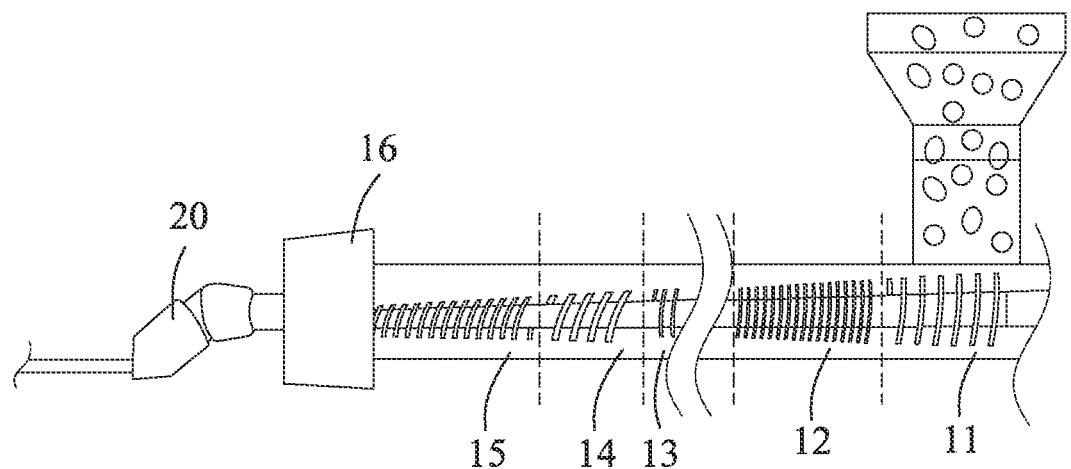
FIG. 1A is a side view of the extruder for processing the husk plastic composition in accordance with the present invention.

Reference will now be made in detail to the present preferred embodiments of the invention, examples of which are illustrated in the accompanying schematic. Wherever possible, the same reference numbers, which used in the schematic and the description are refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of a, an, and the may include reference to the plural unless the context clearly dictates otherwise. Also, as used in the description herein and throughout the claims that follow, the terms comprise or comprising, include or including, have or having, contain or containing and the like are to be understood to be open-ended, i.e., to mean including but not limited to.

To facilitate of understanding and reading the present invention, all the following process of synthesis of this novel husk plastic composite will be described in sequence. However, it should be understandable yet more reasonable that the process of synthesis provided below is only preferable embodiments. Other reasonable adjustments in the same or similar process or steps shall be covered by the present invention.

The present invention provides a husk plastic composition comprises formula as following:

Polyvinyl chloride (PVC) 10 to 20 wt %;

Vinyl chloride/vinyl acetate (VC/VAC) copolymer 10 to 30 wt %;
Styrene-acrylonitrile copolymer (SAN) 1 to 5 wt %;
Chlorinated polyethylene (CPE) 1 to 5 wt %;
Rice husk powder 10 to 40 wt %;
Inorganic filler 10 to 40 wt %;
Internal lubricant 0.1 to 1 wt %;
External lubricant 0.1 to 1 wt %; and
Heat stabilizer 1 to 5 wt %.

The rice husk powder or husk powder is preferred to have particle size in the range of 0.10 to 0.60 mm so as to show better hardness, stiffness and wood-like texture in the final product. In addition, the VC/VAC copolymer in the formulation can reduce the processing temperature of an overall process and can prevent the rice husk powder from being burnt or decomposed due to high temperature of the heating process to achieve the purpose of adding a high content of rice husk powder in the composition. The SAN and the CPE can promote the gelation and mixing performance of the composition and provide rigidness and increased impact resistance. The composition provided by the present invention can reduce the overall content of PVC by introducing a large amount of filling material, but still maintains good product mechanical properties with special component combination.

Figure 1B:
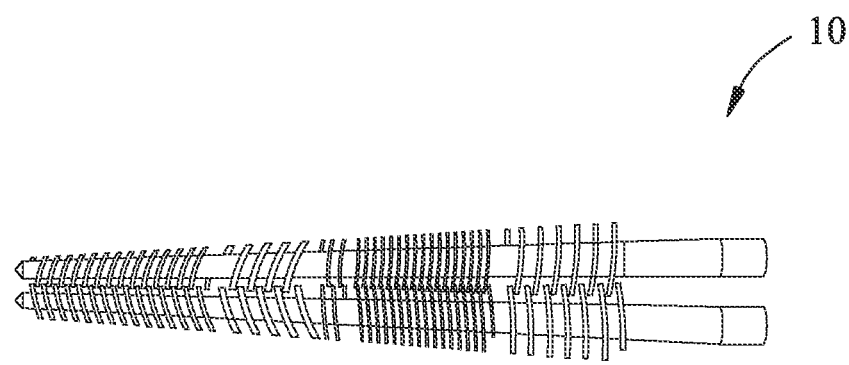
FIG. 1B is a top view of the conical twin screw extruder of the extruder in accordance with the present invention.

With reference to FIGS. 1A and 1B, the husk composition provided by the present invention can be successfully introduced to extrusion process for manufacturing in plate or sheet product with high proportion of rice husk and suitable inorganic filler additive with the processing steps include:

Step S1) Mixing section: using a twin screw extruder 10, such as a conical twin screw extruder to heat and knead the husk plastic composition/mixture as aforementioned to become a husk plastic composite. The twin screw extruder 10 in a barrel has been defined as multiple mixing sections with different temperature including a feeding section (or feed zone) 11, a plasticizing section 12, a compression section 13, a vent section 14 and a metering section 15. The twin screw extruder 10 blends the husk plastic composition/mixture in a heating barrel, after the metering section 15, the husk plastic composition is collected and further introduced to a confluence core 16 for next processing.

Specifically, step S1 can be performed as firstly to measure all raw materials of the husk plastic composition according to the formula as above, and to feed into a high-speed mixer to stir and mix at 1000 rpm for 5 minutes. During the mixing, it is important not to let the temperature of the mixing material exceeding 135° C. to avoid any pre-reaction. Further, mixing the mixture with a low-speed mixer and stirred at a low speed to decrease the temperature of the material to below 45° C. Followed with transporting the mixed materials to a hopper connected with the feeding section 11. The conical twin screw extruder (as shown in the top view of FIG. 1B) in the barrel is pre-set with an appropriate processing temperature (at a range of 140 to to 160° C.) in different sections. When the temperature reaches the set temperature, start feeding and mixing the materials evenly. The husk plastic composition of the present invention is processed after feeding and follows with plasticizing, compressing, venting, and metering with different pre-set temperature described in the aforementioned step S1, and finally reaches the confluent core section 16 and is collected to an extrusion die head of following step S2.

Figure 2:
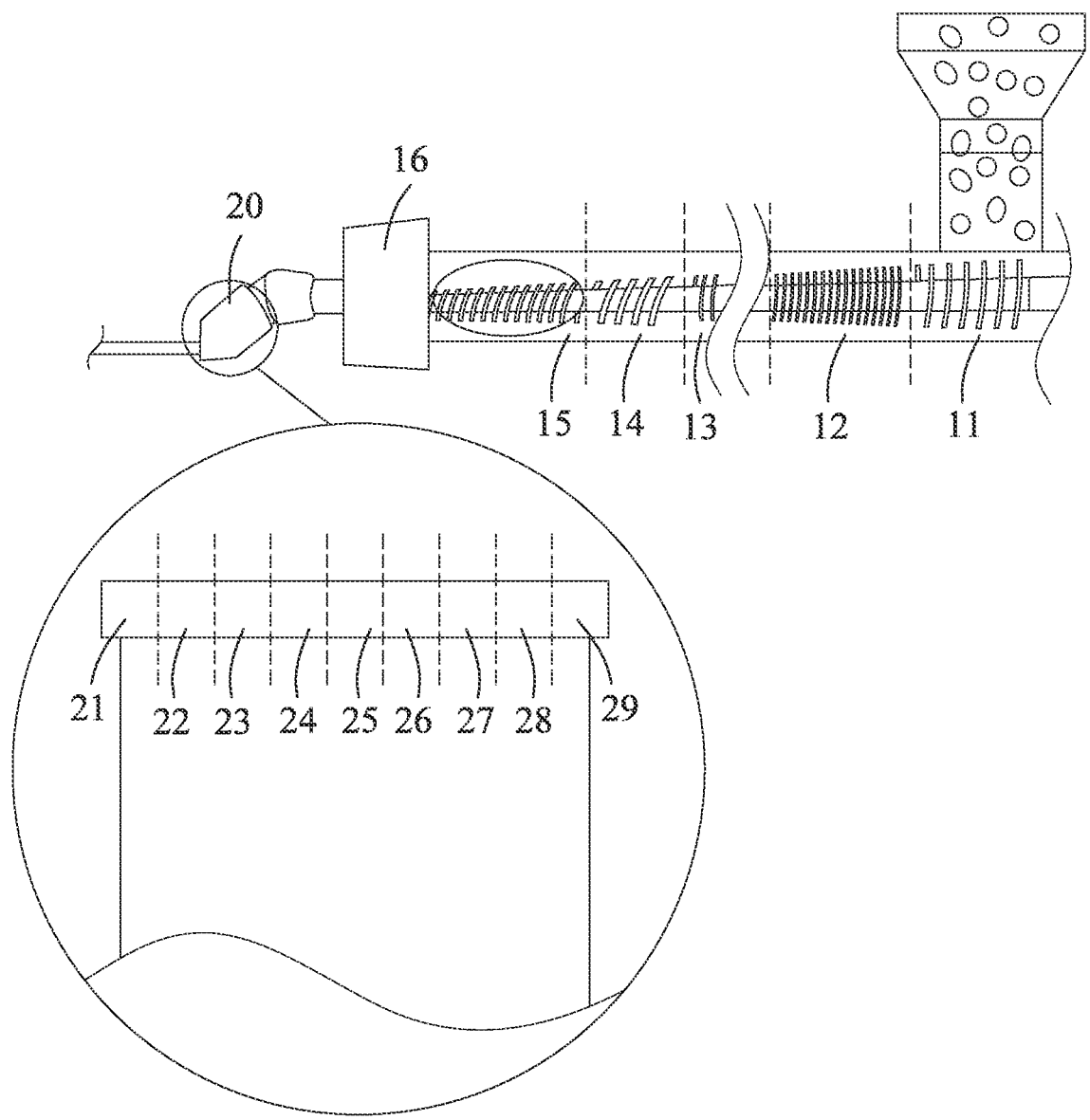
FIG. 2 is an illustrate figure of the extrusion die for processing the husk plastic composition in accordance with the present invention.

Step 2) Forming section: end of the confluence core 16 of the twin screw extruder 10 is connected to an extrusion die (such as a T-die) 20 for shaping and forming the processed husk plastic composition into final product. The extrusion die 20 has an extrusion channel with a flat slit opening extending in the horizontal direction at its end to receive the molten husk plastic composition (or the melt) and output the shaped melt into a sheet or plate form. Such extrusion channel is set in a horizontal direction (or transverse direction) with several different molding sections with different temperature. In the preferred embodiment, nine molding sections are designed for the extrusion channel for controlling a melt fluidity of the husk plastic composition. Optionally, multiple adjusting rods could be used for adjusting the uniformity of the flow from the melt of the composition. As shown in FIG. 2, the molding sections from left to right direction comprises a first forming section 21, a second forming section 22, a third forming section 23, a fourth forming section 24, a fifth forming section 25, a sixth forming section 26, a seventh forming section 27, an eighth forming section 28 and a ninth forming section 29. The extrusion die 20 processed the composition into a flat and even plate or sheet in a pre-set thickness using the molding sections. Preferably, the temperature and extrusion rate of the nine molding sections are different according to the properties of the melt. As a distance between the molding section at the middle and the extrusion die 20 are shorter which the flow of the melt discharged quicker than other sections. Hence, the temperature of the middle sections (like the fifth forming section 25 and the sixth forming section 26) will be set slightly lower than the temperature of the section at two sides (for example, the first forming section 21, the second forming section 22, the third forming section 23 at left side and the seventh forming section 27, the eighth forming section 28, and the ninth forming section 29 on the right), to reduce the extrusion speed of the middle section so as to be closed to the speed as the sections at the sides for stabling the flow of the melt and producing even and flat plate or sheet material (extrudate).

Step 3) (Optional) Producing of finished product/semi-finished product: The extruded flat plate or sheet can continue to be processed as a finished product on the same production line to become, for example, a floor or wallboard decorative material.

Figure 3:
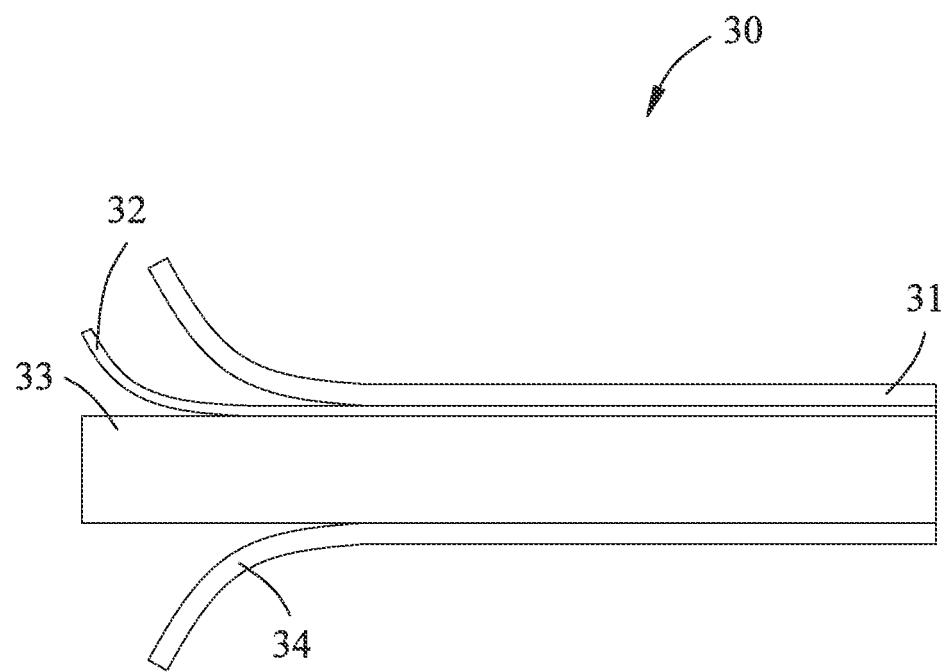
FIG. 3 is an illustrate figure of the plastic flooring using the husk plastic composition in accordance with the present invention.

Taking the flooring product as an example, please refer to FIG. 3, a final plastic flooring 30 of the present invention is presented. First, the husk plastic composition as mentioned above is produced as core sheet to be further laminated with other functional layers includes:

a wear layer 31, which is a polyvinyl chloride (PVC) sheet, preferably a transparent sheet;
a print layer 32 which is also a ink print layer;
a core layer 33, which referred to the aforementioned husk plastic composition;
a foamed layer 34 for sound insulation, such as radiation cross-linked polyethylene (IXPE) foam pads.

To produce the final plastic flooring 30, one preferred embodiment could be roll-to-roll production method including steps as putting the print layer 32 and the wear layer 31 in a sheet roll firstly on a rack above and below the continuously discharging core sheet 33 and dragging by traction wile& and laminated wheel for continuous production. It is preferred that the print layer 32 and the wear layer 31 are pre-heated to be adhered on both surfaces of the core sheet 33 by wheel pressing. Also, the core sheet 33 still have some remaining or residual heat to have its surface maintain some adhesion ability to securely attached to the print layer 32 and the wear layer 31. Further, according to the product requirements, embossing step could be applied to the surface of the final product by reheating the surface temperature through heating zone by the embossing wheel. This semi-finished product continues to be cooled down till the temperature below 40° C. for cutting into suitable pieces for stacking, storing and awaiting for other post-processing processes.

Step 4) (optionally) post-processing: after cooling the temperature of the semi-finished product cooled to room temperature, coating its surface with an acrylic paint and curing by ultraviolet lamp to provide enhanced wear and scratch resistance layer on the surface. Then, the large semi-finished product is cut into pieces according to the required specifications and sizes by saw. Four sides of each flooring are milled with suitable grooves/tongues by a milling machine. The bottom surface of the flooring is adhered with the foamed layer 34 (for example, with density between 0.08 and 0.18 IXPE foam sheet) providing extra impact resistance and sound insulation functions. Finally, package the finished product for storing and shipping. The overall thickness of the final plastic flooring 30 is at a range of 5.0~7.0 min with the thickness of the wear layer 31 is at a range of 0.30~0.55 mm, or more preferably 0.30~0.70 mm, and the thickness of the foamed layer 34 for sound insulation is at a range of 1.0~1.5 mm.

The internal lubricant and the external lubricant in the husk plastic composition in the present invention play different roles. The internal lubricant is mainly for reducing the frictional force that occurs within the PVC molecular chains and could reduce the melt viscosity. It is preferred to be a polar poly fatty acid ester, such as ethylene glycol fatty acid esters, pentaerythritol fatty acid esters, phthalic acid fatty acid esters, and the like, which this material is highly compatible with PVC. The external lubricant otherwise reduces the adhesion between the PVC and the metal surface of the processing equipment. It comprises non-polar material, such as polyethylene wax. The most important is that by introducing the VC/VAC copolymer into the PVC composition material, the present invention can reduce the processing temperature of the plastic melt by at least 50° C. compared with the existing PVC formulation and production method which effectively reduce the energy consumption and prevent the rice husk powder from being over heated or even burnt during the heating process or decomposed due to high temperature.

Embodiment 1

| Materials | Content (Kg) | Proportion (wt %) |
|---|---|---|
| Polyvinyl chloride (PVC) | 45 | 17.1 |
| Vinyl chloride/vinyl acetate (VC/VAC) copolymer | 35 | 13.3 |
| Styrene-acrylonitrile copolymer (SAN) | 2 | 0.76 |
| Chlorinated polyethylene (CPE) | 3 | 1.14 |
| Calcium carbonate | 120 | 45.6 |
| Rice husk powder | 50 | 19.0 |
| Internal lubricant | 0.9 | 0.34 |
| External lubricant | 1.1 | 0.42 |
| Heat stabilizer | 6 | 2.28 |
| Total amount | 263.0 | 100 |

Production Parameters of Embodiment 1

Step 1: setting the twin screw extruder 10 in suitable temperature: the husk plastic composition is uniformly stirred, mixed and kneaded with the conical twin screw extruder, and the mixing sections of this conical twin screw extruder is defined as 5 sections and the preferred to have a confluence core at the end. The temperature of each mixing section is shown in the table below. After the equipment reaches the pre-set temperature, the composition is fed for processing. The speed of the conical twin screw extruder is around 10 rpm. The electric current is applied with 150 to 180 A. The back pressure of the melt is about 1.6-2.0 MPa. The followed extrusion die 20 extrudes the melt into a plate or sheet at a rate around 1020 kg/hour.

| Section | Temperature (° C.) |
|---|---|
| 1 | 160 |
| 2 | 160 |
| 3 | 160 |
| 4 | 160 |
| 5 | 160 |
| Confluence core | 150 |

Step 2: The extrusion channel of the extrusion die 20 is divided into 9 sections. The processing temperature of each section is pre-set at the range 160~190° C. The extrusion speed of each section may also be different to produce a high quality flat sheet or plate material.

Further, the sheet product is processed by the post-processing as mentioned above. The final plastic flooring 30 in this embodiment 1 fulfilled the American rigid polymeric core made resilient flooring standard ASTM F3261, and some basic physical properties and related strength values are as follows.

| Testing Items | Result |
|---|---|
| Density (Refer to ASTM F3261) | 1.75 |
| Dimensional stability after exposure to heat (Refer to ASTM F2199) | Transverse direction (TD) 0.06% Machine direction (MD) 0.10% |
| Curling after exposure to heat (Refer to ASTM F2199) | 0.50 mm |
| Peeling strength (Refer to ISO 24345) | 21 kgf/5 cm |
| Residual indentation (Refer to ASTM F1914) | 0.03 mm |
| Locking strength (Refer to ISO 20326 Annex D) | Long side 850 kgf/m Short side 1100 kgf/m |

Embodiment 2

| Materials | Content (Kg) | Proportions (wt %) |
|---|---|---|
| PVC | 30 | 12.8 |
| VC/VAC copolymer | 50 | 21.3 |
| SAN | 3 | 1.28 |
| CPE | 4 | 1.70 |
| Calcium carbonate | 70 | 29.8 |
| Rice Husk powder | 70 | 29.8 |
| Internal lubricant | 1.2 | 0.51 |
| External lubricant | 1 | 0.43 |
| Heat stabilizer | 6 | 2.55 |
| Total amount | 235.2 | 100 |

Production Parameters of Embodiment 2

Step 1: setting the twin screw extruder 10 in suitable temperature: the husk plastic composition is uniformly stirred, mixed and kneaded with the conical twin screw extruder, and the mixing sections of this conical twin screw extruder is defined as 5 sections and the preferred to have a confluence core section at the end. The temperature of each mixing section is shown in the table below. After the equipment reaches the pre-set temperature, the composition is fed for processing. The speed of the conical twin screw extruder is around 10 rpm. The electric current is applied with 150 to 180 A. The back pressure of the melt is about 1.6 to 2.0 MPa. The followed extrusion die 20 extrudes the melt into a plate or sheet at a rate around 920 kg/hour.

| Section | Temperature (° C.) |
|---|---|
| 1 | 160 |
| 2 | 160 |
| 3 | 160 |
| 4 | 160 |
| 5 | 160 |
| Confluence core | 150 |

Step 2: The extrusion channel of the extrusion die 20 is divided into 9 sections. The processing temperature of each section is pre-set at the range of 160 to 190° C. in each section. The extrusion speed of each section may also be different for manufacturing a high quality flat sheet or plate product.

Further, the sheet product is processed by the post-processing as mentioned above. The final plastic flooring 30 in this embodiment 2 fulfilled the American rigid polymeric core made resilient flooring standard ASTM F3261, and some basic physical properties and related strength values are as follows.

| Testing Items | Result |
|---|---|
| Density (Refer to ASTM F3261) | 1.57 |
| Dimensional stability after exposure to heat (Refer to ASTM F2199) | Transverse direction (TD) 0.08% Machine direction (MD) 0.13% |
| Curling after exposure to heat (Refer to ASTM F2199) | 0.70 mm |
| Peeling strength (Refer to ISO 24345) | 29.5 kgf/5 cm |
| Residual indentation (Refer to ASTM F1914) | 0.05 mm |
| Locking strength (Refer to ISO 20326 Annex D) | Long side 930 kgf/m Short side 1150 kgf/m |

Embodiment 3

| Materials | Content (Kg) | Proportions (wt %) |
|---|---|---|
| PVC | 30 | 12.8 |
| VC/VAC Copolymer | 50 | 21.3 |
| SAN | 4 | 1.70 |
| CPE | 3 | 1.28 |
| Calcium carbonate | 90 | 38.3 |
| Rice husk powder | 50 | 21.3 |
| Internal lubricant | 1.2 | 0.51 |
| External lubricant | 0.8 | 0.34 |
| Heat stabilizer | 6 | 2.55 |
| Total amount | 235.0 | 100 |

Production Parameter of Embodiment 3

Step 1: setting the twin screw extruder 10 in suitable temperature: the husk plastic composition is uniformly stirred, mixed and kneaded with the conical twin screw extruder, and the mixing sections of this conical twin screw extruder is defined as 5 sections and the preferred to have a confluence core section at the end. The temperature of each mixing section is shown in the table below. After the equipment reaches the pre-set temperature, the composition is fed for processing. The speed of the conical twin screw extruder is around 10 rpm. The electric current is applied with 150 to 180 A. The back pressure of the melt is about 1.6 to 2.0 MPa. The followed extrusion die 20 extrudes the melt into a plate or sheet at a rate around 970 kg/hour.

| Section | Temperature (° C.) |
|---|---|
| 1 | 160 |
| 2 | 160 |
| 3 | 160 |
| 4 | 160 |
| 5 | 160 |
| Confluence core | 150 |

Step 2: The extrusion channel of the extrusion die 20 is divided into 9 sections. The processing temperature of each section is pre-set at the range of 160 to 190° C. The extrusion speed of each section may also be different for manufacturing a high quality flat sheet or plate product.

Further, the sheet product is processed by the post-processing as mentioned above. The final plastic flooring 30 in this embodiment 3 fulfilled the American rigid polymeric core made resilient flooring standard ASTM F3261, and some basic physical properties and related strength values are as follows.

| Testing items | Result |
|---|---|
| Density (Refer to ASTM F3261) | 1.66 |
| Dimensional stability after exposure to heat (Refer to ASTM F2199) | Transverse direction (TD) 0.08% Machine direction (MD) 0.11% |
| Curling after exposure to heat (Refer to ASTM F2199) | 0.60 mm |
| Peeling strength (Refer to ISO 24345) | 30.1 kgf/5 cm |
| Residual indentation (Refer to ASTM F1914) | 0.04 mm |
| Locking strength (Refer to ISO 20326 Annex D) | Long side 870 kgf/m Short side 1130 kgf/m |

Embodiment 4

| Materials | Content (Kg) | Proportion (wt %) |
|---|---|---|
| PVC | 30 | 12.8 |
| VC/VAC copolymer | 50 | 21.3 |
| SAN | 4 | 1.70 |
| CPE | 3 | 1.28 |
| Calcium carbonate | 115 | 49.0 |
| Rice husk powder | 25 | 10.6 |
| Internal lubricant | 1 2 | 0.51 |
| External lubricant | 0.7 | 0.30 |
| heat stabilizer | 6 | 2.55 |
| Total amount | 234.9 | 100 |

Production Parameters of Embodiment 4

Step 1: setting the twin screw extruder 10 in suitable temperature; the husk plastic composition is uniformly stirred, mixed and kneaded with the conical twin screw extruder, and the mixing sections of this conical twin screw extruder is defined as 5 sections and the preferred to have a confluence core section at the end. The temperature of each mixing section is shown in the table below. After the equipment reaches the pre-set temperature, the composition is fed for processing. The speed of the conical twin screw extruder is around 10 rpm. The electric current is applied with 150 to 180 A. The back pressure of the melt is about 1.6 to 2.0 MPa. The followed extrusion die 20 extrudes the melt into a plate or sheet at the rate of around 1030 kg/hour.

| Section | Temperature (° C.) |
| --- | --- |
| 1 | 160 |
| 2 | 160 |
| 3 | 160 |
| 4 | 160 |
| 5 | 160 |
| Confluence core | 150 |

Step 2: The extrusion channel of the extrusion die 20 is divided into 9 sections. The processing temperature of each section is pre-set at the range of 160 to 190° C. The extrusion speed of each section may also be different for manufacturing a high quality flat sheet or plate product.

Further, the sheet product is processed by the post-processing as mentioned above. The final plastic flooring 30 in this embodiment 4 fulfilled the American rigid polymeric core made resilient flooring standard ASTM F3261, and some basic physical properties and related strength values are as follows.

| Testing Items | Result |
| --- | --- |
| Density (Refer to ASTM F3261) | 1.77 |
| Dimensional stability after exposure to heat (Refer to ASTM F2199) | Transverse direction (TD) 0.05% Machine direction (MD) 0.09% |
| Curling after exposure to heat (Refer to ASTM F2199) | 0.50 mm |
| Peeling strength (Refer to ISO 24345) | 28.4 kgf/5 cm |
| Residual indentation (Refer to ASTM F1914) | 0.03 mm |
| Locking strength (Refer to ISO 20326 Annex D) | Long side 780 kgf/m Short side 1100 kgf/m |

Comparative Embodiment 1

| Materials | Content (Kg) | Proportion (wt %) |
| --- | --- | --- |
| PVC | 75 | 23.8 |
| VC/VAC copolymer | 0 | 0.0 |
| SAN | 3 | 0.95 |
| CPE | 4 | 1 27 |
| Calcium carbonate | 225 | 71.4 |
| Husk powder | 0 | 0.0 |
| Internal lubricant | 1.2 | 0.38 |
| External lubricant | 0.8 | 0.25 |
| Heat stabilizer | 6 | 1.90 |
| Total amount | 315 | 100 |

Production Parameters of Comparative Embodiment 1

Step 1: setting the twin screw extruder in suitable temperature: the composition of comparative embodiment is uniformly stirred, mixed and kneaded with the conical twin screw extruder, and the mixing sections of this conical twin screw extruder is defined as 5 sections and the preferred to have a confluence core section at the end. The temperature of each mixing section is shown in the table below. After the equipment reaches the pre-set temperature, the composition is fed for processing. The speed of the conical twin screw extruder is around 10 rpm. The electric current is applied with 190 to 210 A. The back pressure of the melt is about 10 to 12 MPa which is so condensed to be properly processed in a uniformly or even melt condition. The followed extrusion die 20 extrudes the melt into a plate or sheet at a rate around 1200 kg/hour.

| Section | Temperature (° C.) |
| --- | --- |
| 1 | 235 |
| 2 | 235 |
| 3 | 235 |
| 4 | 230 |
| 5 | 210 |
| Confluence core | 190 |

Step 2: The extrusion channel of the extrusion die 20 is divided into 9 sections. The processing temperature of each section is pre-set at the range 205 to 220° C. The extrusion speed of each section may also be different for manufacturing a high quality flat sheet or plate product.

Further, the sheet product is processed by the post-processing as mentioned above. The final plastic flooring 30 in this comparative embodiment 1 fulfilled the American rigid polymeric core made resilient flooring standard ASTM F3261, and some basic physical properties and related strength values are as follows.

| Testing Items | Result |
| --- | --- |
| Density (Refer to ASTM F3261) | 2.05 |
| Dimensional stability after exposure to heat (Refer to ASTM F2199) | Transverse direction (TD) 0.03% Machine direction (MD) 0.05% |
| Curling after exposure to heat (Refer to ASTM F2199) | 0.40 mm |
| Peeling strength (Refer to ISO 24345) | 8.6 kgf/5 cm |
| Residual indentation (Refer to ASTM F1914) | 0.03 mm |
| Locking strength (Refer to ISO 20326 Annex D) | Long side 390 kgf/m Short side 530 kgf/m |

The present invention provides husk plastic composition to b produced in a sheet product as a core layer to be laminated with other surface material. As the embodiment mentioned above, the husk plastic composite core layer is laminated with a PVC print layer and a PVC wear layer on the surface to form a decorative panel, which can be applied to floors or wall constructions. Further, the laminates could adhere with IXPE foam insulation layer to provide impact resistant and sound insulation properties.

From the comparison of the four embodiments of the present invention with the comparative embodiment, it is clear that the addition of VC/VAC copolymer can reduce the processing temperature and energy consumptions. The husk powder can also reduce the density of the final product to lose weight. Although dimension stability, curling after exposure to heat and residual indentation performance might weaken slightly, it will not affect normal use. The peeling strength and the locking strength are significantly improved, which is helpful for the stability and durability of the product.

The present invention provides husk plastic composition to be produced in a sheet product as a core layer to be laminated with other surface materials. As the embodiment mentioned above, the husk plastic composite core layer is laminated with a PVC print layer and a PVC wear layer on the surface to form a decorative panel, which can be applied to floors or wall constructions. Further, the laminates could adhere with foam insulation layer to provide impact-resistant and sound insulation properties.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A husk plastic composition comprising:
Polyvinyl chloride (PVC) 10 to 20 wt %;
Vinyl chloride/vinyl acetate (VC/VAC) copolymer 10 to 30 wt %;
Styrene-acrylonitrile copolymer (SAN) 1 to 5 wt %;
Chlorinated polyethylene (CPE) 1 to 5 wt %;
Rice husk powder 10 to 40 wt %;
Inorganic filler 10 to 40 wt %;
Internal lubricant 0.1 to 1 wt %;
External lubricant 0.1 to 1 wt %; and
Heat stabilizer 1 to 5 wt %.

2. The composition as claimed in claim 1, wherein:
the particle size of the husk powder is at a range of 0.10 to 0.60 mm;
the inorganic filler comprises calcium carbonate;
the internal lubricant comprises polar polyfatty acid ester; and
the external lubricant comprises non-polar polyethylene wax.

3. A processing method of a husk plastic composition comprising steps of:
providing a husk plastic composition as claimed in claim 1;
using a twin screw extruder to heat and knead the husk plastic composition, wherein the twin screw extruder comprises multiple mixing sections with different temperature including a feeding section, a plasticizing section, a compression section, a vent section and a metering section; and
molding the husk plastic composition into sheet or plate material by an extrusion die, wherein the extrusion die comprises an extrusion channel with a flat slit opening extending in the horizontal direction defined with different molding sections with different temperatures.

4. The method as claimed in claim 3, wherein:
the molding sections comprises a first molding section, a second molding section, a third molding section, a fourth molding section, a fifth molding section, a sixth molding section, a seventh molding section, an eighth molding section and a ninth molding section with different temperature and different extrusion rate.

5. The method as claimed in claim 3, wherein: a temperature of the molding section at middle is lower than those of outer sides.

6. The method as claimed in claim 3, wherein: further laminating the sheet or plate material with functional surface layers.

7. The method as claimed in claim 6, wherein: further applying a acrylate coating on the surface of the wear layer, curing with UV light, and milling the grooves/tongues at four edges of the sheet or plate product for locking installation.

8. A plastic flooring comprising:
a wear layer which is made by PVC sheet;
a print layer;
a core layer which contains a sheet or plate material of a husk plastic composition as claimed in claim 1;
a foamed layer for sound insulation includes an IXPE foam pad.

9. The plastic flooring as claimed in claim 8, wherein: an overall thickness of the plastic flooring is at a range of 5.0 to 7.0 mm, including a range of 0.30 to 0.70 mm thickness of the wear layer and a range of 1.0 to 1.5 mm thickness of the foamed sound insulation layer.

* * * * *